(12) United States Patent
Nejabati et al.

(10) Patent No.: US 11,095,757 B2
(45) Date of Patent: Aug. 17, 2021

(54) SDN INTERFACE DEVICE (71) Applicant: Zeetta Networks Limited, Bristol (GB)

(72) Inventors: Reza Nejabati, Bristol (GB); Vassilis Seferidis, Bristol (GB); Mayur Channegowda, Bristol (GB)

(73) Assignee: Zeetta Networks Limited, Bristol (GB)

(*) Notice: Subject to any disclaimer, the term of this patent is extended or adjusted under 35 U.S.C. 154(b) by 123 days.

(21) Appl. No.: 16/303,977

(22) PCT Filed: May 23, 2017

(86) PCT No.: PCT/GB2017/051431
§ 371 (c)(1),
(2) Date: Nov. 21, 2018

(87) PCT Pub. No.: WO2017/203228
PCT Pub. Date: Nov. 30, 2017

(65) Prior Publication Data
US 2020/0322459 A1  Oct. 8, 2020

(30) Foreign Application Priority Data

May 23, 2016  (GB) .................................... 1608990

(51) Int. Cl.
*H04L 15/08* (2006.01)
*H04L 29/06* (2006.01)
(Continued)

(52) U.S. Cl.
CPC .............. *H04L 69/08* (2013.01); *H04L 12/66* (2013.01); *H04L 41/0213* (2013.01);
(Continued)

(58) Field of Classification Search
CPC ..... H04L 69/08; H04L 12/66; H04L 41/0213; H04L 41/0809; H04L 45/38; H04L 45/64
See application file for complete search history.

(56) References Cited

U.S. PATENT DOCUMENTS

2013/0195113 A1* 8/2013 Kotha ................... H04L 45/64
370/401
2013/0223226 A1* 8/2013 Narayanan ............. H04L 49/25
370/236

FOREIGN PATENT DOCUMENTS

CN         105616178 A      4/2016

OTHER PUBLICATIONS

International Search Report for related International Application No. PCT/GB2017/05431; dated Sep. 20, 2017.
(Continued)

*Primary Examiner* — Brenda H Pham
(74) *Attorney, Agent, or Firm* — von Briesen & Roper, s.c.

(57) ABSTRACT

An interface device (100) for interfacing between a network device (170-240) and a software-defined networking (SDN) controller (150), the interface device (100) comprising: a first interface (140) for connecting the interface device (100) to the SDN controller (150); a second interface (160) for connecting the interface device (100) to the network device (170-240); a vendor and technology specific layer module (110), which is operative to transmit control and message data to, and to receive control and message data from, the network device (170-240) in a native control and message data protocol of the network device; a device abstraction layer module (120), which is operative to generate a device abstraction model (400) representing capabilities of the network device (170-240); and a protocol mapping layer module (130), which is operative to map control and message data used by the network device (170-240) onto the device abstraction model (400), such that messages issued by the SDN controller (150) in its native message format can be transmitted to the network device in a native message format of the network device (170-240), and messages issued by the network device (170-240) in its native message
(Continued)

format can be transmitted to the SDN controller (150) in the native message format of the SDN controller (150).

11 Claims, 5 Drawing Sheets

(51) Int. Cl.
*H04L 12/66* (2006.01)
*H04L 12/24* (2006.01)
*H04L 12/721* (2013.01)
*H04L 12/715* (2013.01)

(52) U.S. Cl.
CPC .......... *H04L 41/0809* (2013.01); *H04L 45/38* (2013.01); *H04L 45/64* (2013.01)

(56) References Cited

OTHER PUBLICATIONS

United Kingdom Search Report for related GB Application No. 1608990.6 report dated Dec. 15, 2016.
Mahamoud Bahnasy, et al., "OpenFlow and GMPLS United Control Planes", Testbed Implementation and Comparative Study, IEEE/OSA, Journal of Optical Communication, vol. 7, Issue 4, Apr. 2015.

* cited by examiner

SDN INTERFACE DEVICE

CROSS-REFERENCE TO RELATED APPLICATION

This Application is a 35 USC § 371 US National Stage filing of International Application No. PCT/GB2017/051431 filed on May 23, 2017 which claims priority under the Paris Convention to United Kingdom Patent Application No. 1608990.6 filed on May 23, 2016.

TECHNICAL FIELD

The present application relates to the field of software-defined networking (SDN), and in particular to an interface device for interfacing between a network device and an SDN controller.

BACKGROUND TO THE INVENTION

One of the most pressing problems in the telecommunications industry today is increasing demand for data, driven by the ever growing popularity of smartphones, cloud services and big data and more recently the emergence of the Internet of Things (i.e. billions of connecting devices from connected fridges to smart energy meters and wearable electronics). It is estimated that the demand for data will increase steadily over the next 5 years with an average annual growth rate of nearly 60%.

Existing Information and Communications (ICT) networks are struggling to cope with this increasing demand for data, because conventional network architectures are not suitable for satisfying the expected demand, for a number of reasons. For example, existing network architectures cannot cope with data traffic across different technology platforms and cannot meet the demands for capacity and latency required by new applications. Moreover, it is very expensive to build, run and expand networks.

Figure 1:
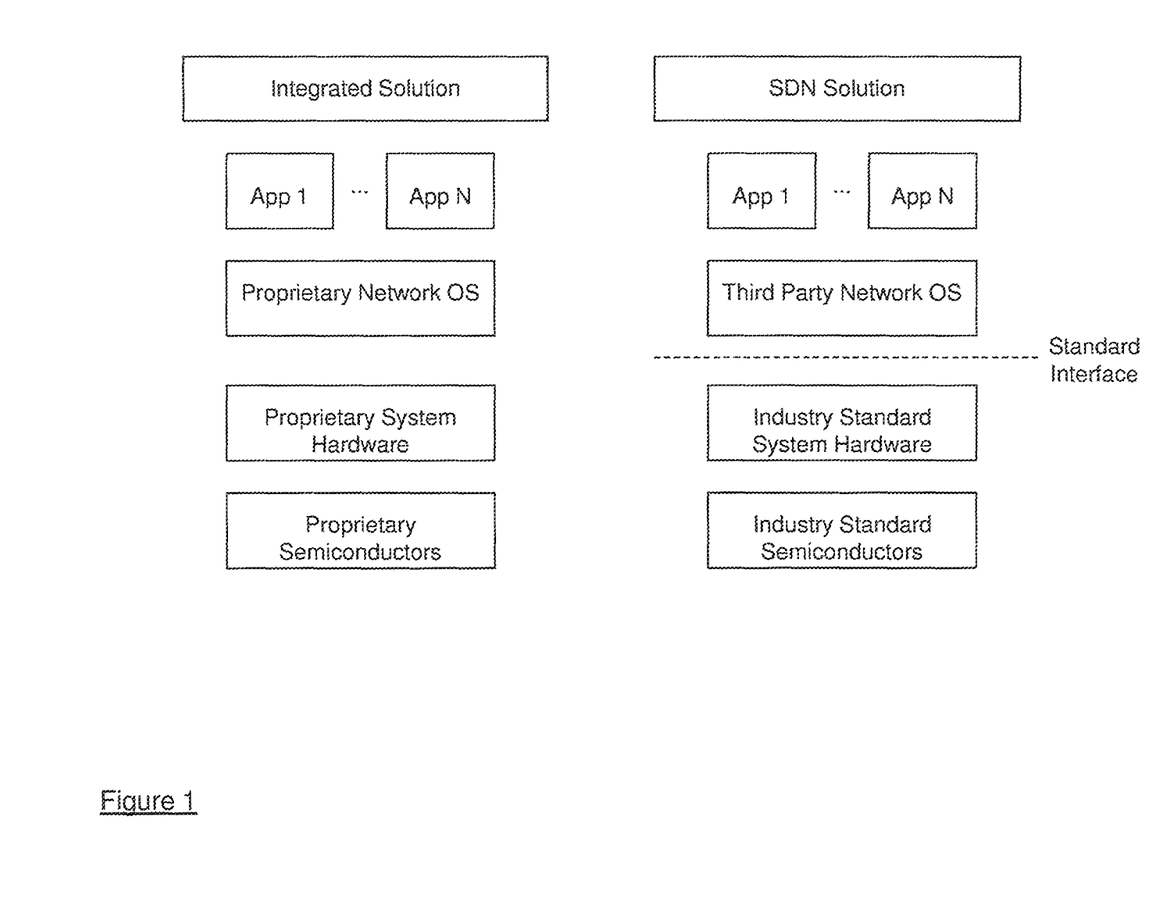
FIG. 1 is a schematic diagram illustrating the difference between a conventional network architecture and a Software Defined Networking (SDN) architecture.

In an attempt to address these issues, a new approach to design, operate and manage networks has been developed, based on the concept of Software Defined Networking (SDN). Instead of the expensive and closed solutions offered by the traditional network equipment vendors, SDN offers a simpler, cheaper, and more flexible approach in network design where the control plane (i.e. control software, often called "Network Operating System" or "Network OS") is separated from the data plane (i.e. forwarding hardware). FIG. 1 illustrates the difference between a conventional network architecture (shown on the right in FIG. 1) and an SDN architecture (shown on the left in FIG. 1).

OpenFlow® (OF) is an open international standard developed by the Open Networking Foundation (ONF) which enables the realization of SDN network architectures by defining a vendor- and technology-agnostic protocol and interface between the data and control planes. It is based on flow switching with the capability to execute software/user-defined routing, control and management from a controller outside the data path. In the OF protocol, a flow is the basic switching entity in the network and is defined as any arbitrary combination of the header fields in a standard packet. As such, a flow in an OF-enabled packet-switched network comprises any packets in which their header fields match the flow definition.

This approach (i.e. SDN based via OF protocol) works well for packet-switched network devices (e.g. Ethernet switches) which are inherently digital, but it is not applicable to optical or wireless networks where the transport of data is analogue by nature (i.e. wavelengths or frequencies) and the concept of digital packets does not exist.

The vast majority of commercially available SDN-enabled network devices based on OF are packet switched. Only a handful of optical and wireless network devices support SDN based on OF.

Such devices typically belong to one of the following categories:

1. Optical Switches
    Digital SDN-enabled optical switches: These are fundamentally time-slotted packet switching devices that use optoelectronic switching technologies such as OTN (Optical Transport Network) or SDH (Synchronous Digital Hierarchy).
    All-optical SDN-enabled switches: These typically support standard port and/or fiber switching without any specific optical features such as power management, interference between adjacent wavelengths, etc.
    A combination of the technology architectures described above.
    There is no SDN solution for modern optical switching technologies e.g. flexi-WDM (Wavelength Division Multiplexing) switches
2. Wireless Switches/Routers
    Current SDN-enabled solutions support only Wi-Fi devices (i.e. there is no support for other popular wireless technologies such as LTE, Bluetooth, ZigBee, etc.)
    Existing solutions abstract a Wi-Fi router/switch or a Wi-Fi Access Point Controller as a simple layer 2 packet switch without any control of the actual wireless transmission
    All existing SDN-enabled network solutions are vendor-specific and tightly integrated with the vendor's hardware controller (optical or wireless).
3. IoT Gateway Devices
    A new type of networking devices is emerging for interconnecting IoT devices to the network. These devices are typically called IoT Gateways. Currently there is no SDN solution for IoT gateway devices.

Figure 2:
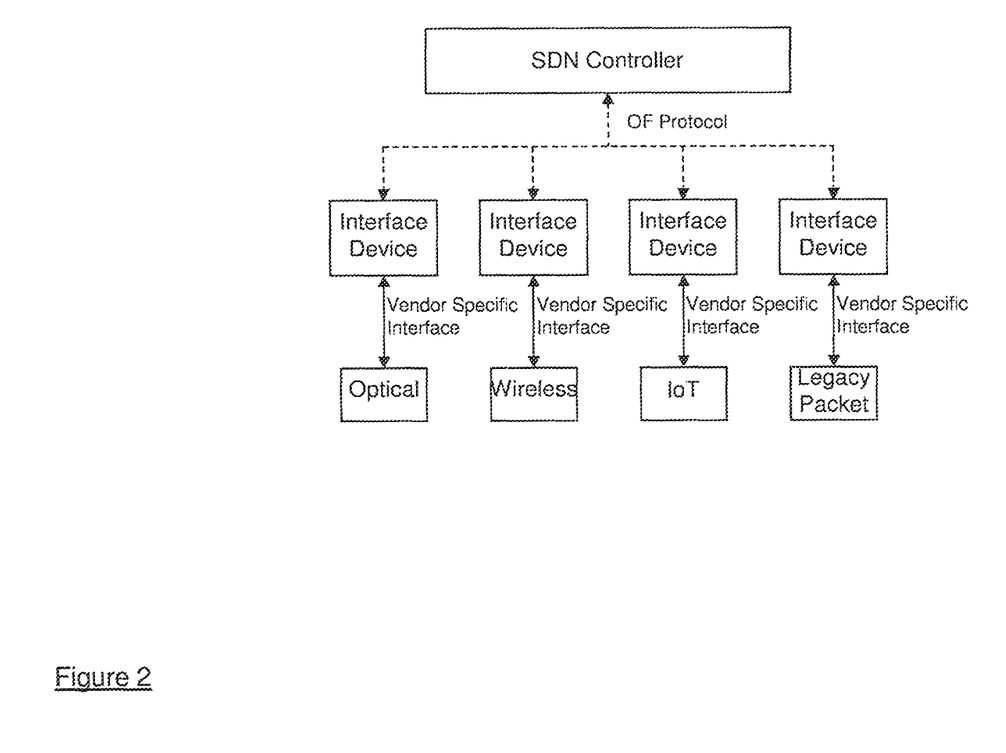
FIG. 2 is a schematic representation of an SDN architecture incorporating interface devices between an SDN controller and various different network devices.

In order to extend the benefits of SDN to the aforementioned devices, a need exists for an intermediate adaptor or interface device (sometimes referred to as a "middlebox") that sits between an optical switch or a wireless router/switch/Access Point or IoT gateway and the Network OS of an SDN enabled network (and more precisely its "SDN Controller" module), as shown in FIG. 2, so those devices can become visible and programmable through the OF protocol interface.

SUMMARY OF INVENTION

According to a first aspect of the present invention there is provided an interface device for interfacing between a network device and a software-defined networking (SDN) controller, the interface device comprising: a first interface for connecting the interface device to the SDN controller; a second interface for connecting the interface device to the network device; a vendor and technology specific layer module, which is operative to transmit control and message data to, and to receive control and message data from, the network device in a native control and message data protocol of the network device; a device abstraction layer module, which is operative to generate a device abstraction model representing capabilities of the network device; and a protocol mapping layer module, which is operative to map control and message data used by the network device onto the device abstraction model, such that messages issued by the SDN controller in its native message format can be transmitted to the network device in the native message format of the network device, and messages issued by the network device in its native message format can be transmitted to the SDN controller in the native message format of the SDN controller.

The SDN controller may be compliant with the OpenFlow protocol, for example.

Thus, the interface device of the present invention can be used not only to provide access, control and monitoring of wireless, optical and IoT gateway devices in a SDN network through the OpenFlow® standard protocol but also to enable legacy non-SDN compliant products to become programmable via OpenFlow®.

The device abstraction layer module may be operative to generate a device abstraction model representing switching capabilities of the network device in one or more of: time, space and frequency domains.

The device abstraction layer module may be operative to generate a device abstraction model representing switching, transmission and data collection capabilities of the network device in one or more of time, space and frequency domains.

The vendor and technology specific layer module may be operative to capture capabilities of the network device, and the device abstraction layer module may be operative to generate the device abstraction model based on the captured capabilities.

The first interface may comprises an Ethernet socket layer.

The network device may comprise, for example, one or more of: an optical fibre switch; an optical wavelength division multiplexing switch; an optical flexi wavelength division multiplexing switch; an optical fixed grid wavelength selective switching switch; an optical flexi grid wavelength selective switching switch; a wireless access point controller; a WiFi controller; an eNodeB of an LTE or LTE-A network; a wireless access point; and an Internet of Things gateway.

The second interface may support one or more of the following interfaces and protocols: Ethernet; Secure Shell; Telnet; Transaction Language 1; Simple Network Management Protocol; Control And Provisioning of Wireless Access Points; and Internet Control Message Protocol.

The device abstraction model may include one or more of the following fields: a port or space field relating to space switching capabilities supported by the network device; a wavelength (lambda) or centre frequency field relating to a number of frequency channels or wavelength channels supported by the network device 170-240; a bandwidth field relating to maximum and minimum bandwidths supported per frequency or wavelength by the network device 170-240; a timeslot field relating to the number of time slots and their duration supported by the network device, if the network device supports timeslot switching; a bitrate field relating to the data bitrate ranges supported by the network device; a power field relating to the signal power range supported by the network device; a signal type field relating to signal formats and modulation types supported by the network device; a features field used to accommodate device-specific features of the network device; a network name field relating to network names used by the network device; an IP/Ethernet header field used to capture IP or Ethernet headers used by the network device.

The interface device is preferably plug and play compatible.

The vendor and technology specific layer module, the device abstraction layer module and the protocol mapping layer module may be implemented as software modules configured to execute on processing hardware of the interface device.

According to a second aspect of the invention there is provided a software module for use in a network device for interfacing between the network device and a software-defined networking (SDN) controller, the software module comprising; a vendor and technology specific layer module, which is operative to transmit control and message data to, and to receive control and message data from, the network device in the native control and message data protocol of the network device; a device abstraction layer module, which is operative to generate a device abstraction model representing capabilities of the network device.

According to a third aspect of the invention there is provided a software module for use in a network operating system of a software defined networking (SDN) controller for interfacing between a network device and the software-defined networking (SDN) controller, the software module comprising: a protocol mapping layer module, which is operative to map control and message data used by the network device onto a device abstraction model, such that messages issued by the SDN controller in its native message format can be transmitted to the network device in the native message format of the network device, and messages issued by the network device in its native message format can be transmitted to the SDN controller in the native message format of the SDN controller.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 3:
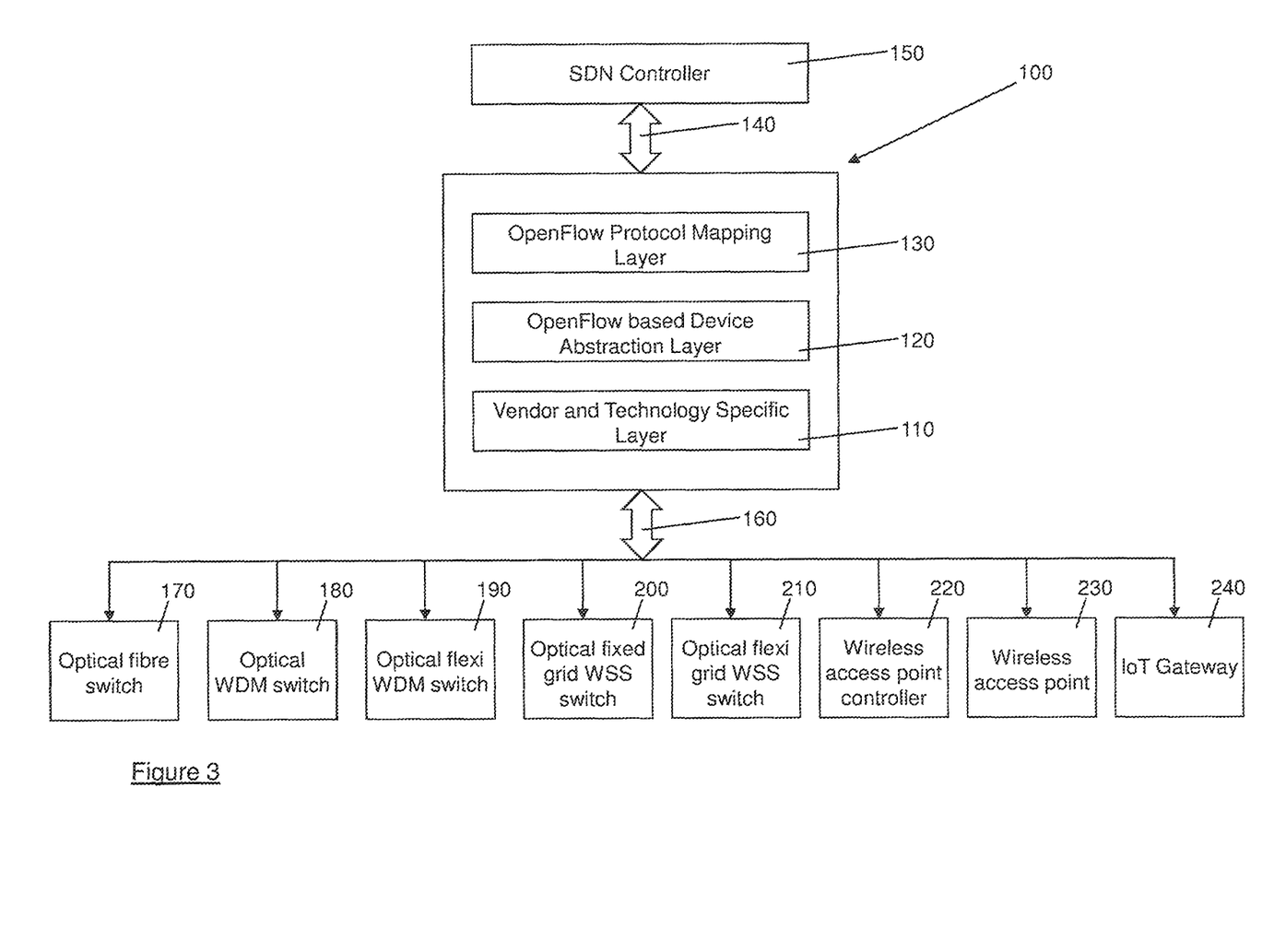
FIG. 3 is a schematic diagram showing an SDN interface device according to the present invention.

Referring first to FIG. 3, an interface device (or "middlebox") for use in a software defined network is shown generally at 100. The interface device 100 is a plug and playable device that sits between an SDN controller and one or more network devices, and is configured (either pre-configured or once installed) to permit control and monitoring of the network device(s) by the SDN controller, as will be explained below.

The interface device 100 comprises a hardware platform which may be, for example, an FPGA (Field Programmable Gate Array) platform, a platform based on semiconductor IP provided by ARM, a platform based on a proprietary ASIC (Application Specific Integrated Circuit), a platform including servers and embedded platforms using general purpose processors (e.g., servers or platforms by Intel Corporation or AMD).

The hardware platform hosts a vendor and technology specific layer module 110, an OpenFlow® based device abstraction layer module 120 and a protocol mapping layer module 130. The modules 110, 120, 130 may be implemented as software modules which are executed by processing hardware of the interface device 100.

The interface device 100 also has a first interface 140, through which the interface device 100 can connect to an SDN controller 150, and a second interface 160, through which the interface device 100 can connect to a control and management interface of a network device such as an optical fibre switch 170, an optical WDM (wavelength division multiplexing) switch 180, an optical flexi WDM switch 190, an optical fixed grid WSS (wavelength selective switching) switch 200, an optical flexi grid WSS switch 210, a wireless access point controller (e.g. a WiFi controller or an eNodeB of an LTE (Long Term Evolution) or LTE-A (LTE-Advanced) network) 220, a wireless access point 230 or an Internet of Things (IoT) gateway 240.

To enable communication between the interface device 100 and the SDN controller 150, the first interface 140 is supported over an Ethernet socket layer.

To enable communication between the interface device 100 and the various different network devices 170-240, the second interface 160 supports any combination of the following interfaces and protocols: Ethernet, SSH (Secure SHell), Telnet, TL1 (Transaction Language 1), SNMP (Simple Network Management Protocol), CAPWAP (Control And Provisioning of Wireless Access Points) and ICMP (Internet Control Message Protocol).

The vendor and technology specific layer module 110 is configured to transmit control and message data to, and to receive control and message data from, a network device 170-240 to which the interface device 100 is connected (via a control and management interface of that connected network device 170-240). These control and message data are transmitted and received in the native format of the connected network device (i.e. in a format that is compliant with the control and message data protocol under which the connected network device 170-240 operates).

The vendor and technology specific layer module 110 is also configured to interrogate the connected network device 170-240 in order to determine physical attributes and capabilities of the network device in time, space and frequency domains, such as switching capabilities of the connected network device 170-240 (e.g. where the connected network device is a switching device), data transmission capabilities of the connected network device 170-240 and the capabilities of the connected network device 170-240 to collect machine or sensor data (e.g. where the connected network device is an Internet of Things gateway or device).

The vendor and technology specific layer module 110 reports the results of this interrogation to the device abstraction layer module 120, to enable the device abstraction layer module 120 to create a device abstraction model for the connected network device 170-240. This device abstraction model permits the "translation" of OpenFlow® compliant command and data messages issued by the SDN controller 150 into device specific command and data messages that are compliant with the command and data message protocol under which the connected network device 170-240 operates, in order to permit the SDN controller 150 uniformly and in the same way to control and monitor the connected network device 170-240. Thus, the interface device 100 renders the physical attributes and capabilities of the connected network device 170-240 and abstracts this information to the SDN controller 150 using extensions to the OpenFlow® protocol data model and communication messages.

For example, modern all-optical switching devices and wireless devices operate on switching and transmission of analogue bandwidth in the time, frequency or space domains (or any combination of the time, frequency and space domains). Therefore unlike traditional packet based OpenFlow® compliant switches, the concept of flow-based switching under the control of an SDN controller cannot be applied directly to such modern switching devices and wireless devices. Accordingly, some "translation" between the flow-based switching model of the SDN controller and the switching and transmission of analogue bandwidth in the time, frequency and/or space domains is required.

Similarly, modern IoT gateway devices operate on switching, collection and transmission of data from machines in the time, frequency or space domains (or any combination of the time, frequency and space domains). Again, therefore, unlike traditional packet based OpenFlow® compliant switches, the concept of flow-based switching under the control of an SDN controller cannot be applied directly to such modern IoT gateway devices, and some "translation" between the flow-based model of the SDN controller and the switching, collection and transmission of data from machines in the time, frequency or space domains is required.

Figure 4:
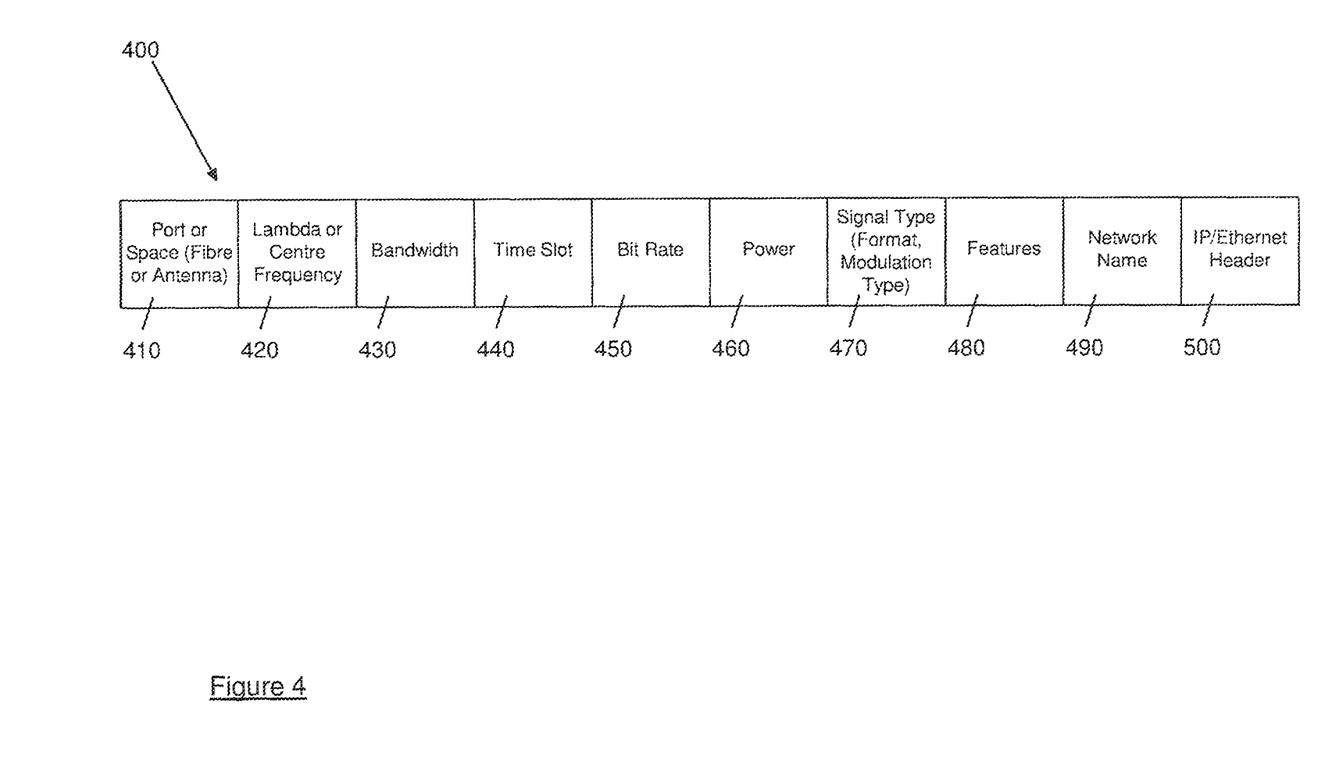
FIG. 4 is a schematic representation of an OpenFlow® abstraction model as used by the SDN interface device of FIG. 3.
Figure 5:
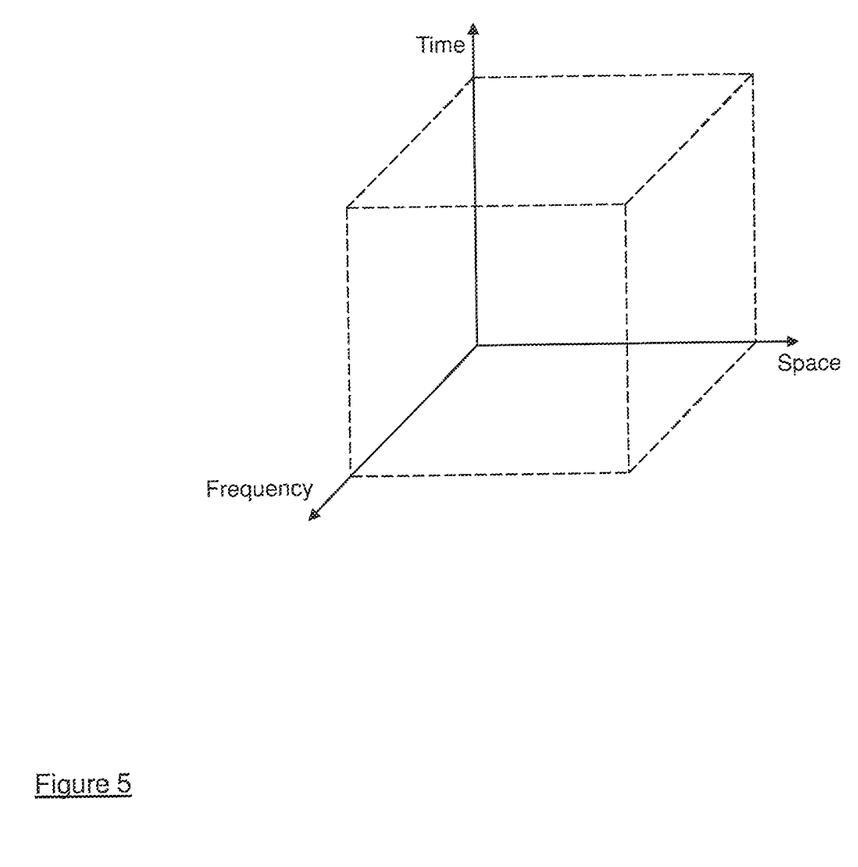
FIG. 5 is a diagrammatic representation of a bandwidth abstraction model as composed by the SDN interface device of FIG. 3.

To address this issue, the device abstraction layer module 120 includes rendering logic that is configured to create a flow-based device abstraction model of the kind shown generally at 400 in FIG. 4 for the connected network device 170-240, based on the attribute and capability information received from the vendor and technology specific layer module 110. The abstraction model takes into account the bandwidth, switching and connectivity capabilities in the time, frequency and space domains of the connected network device 170-240, as represented graphically in FIG. 5.

The flow-based device abstraction model 400 includes any combination of the fields shown in FIG. 4 that is appropriate to the connected network device 170-240. Thus, a device abstraction model 400 for a particular connected network device 170-240 may include any combination of the following fields, or indeed all of the fields:

Port or space 410: This field refers to the space switching capabilities that the connected network device 170-240 supports. For optical devices this field reflects the number of optical ports, whereas for wireless devices this field reflects the number of antennas or the number of antenna directions, or both. Thus, for wireless devices this field reflects the capabilities of the device in the space domain.

Wavelength (lambda) or centre frequency 420: This field refers to the number of frequency channels or wavelength channels supported by the connected network device 170-240, and their exact frequency or wavelength value. Thus, this field reflects the capabilities of the device in the frequency domain.

Bandwidth 430: This field refers to the maximum and minimum bandwidth supported per frequency or wavelength supported by the connected network device 170-240, and to bandwidth tuning granularity.

Timeslot 440: This field refers to the number of time slots and their duration, for connected network devices 170-240 that support timeslot switching. Thus, this field reflects the capabilities of the device in the time domain.

Bitrate 450: This field refers to the data bitrate ranges supported by the connected network device 170-240.

Power 460: This field refers to the signal power range per port supported by the connected network device 170-240.

Signal type 470: This field refers to the signal formats and modulation types supported by the connected network device 170-240.

Features 480: This field is used to accommodate device-specific features of the connected network device 170-240 such as power sensitivity.

Network name 490: This field refers to the network names (e.g. SSIDs or logical networks) used by the connected network device 170-240.

IP/Ethernet header 500: This field is used to capture IP or Ethernet headers used by the connected network device 170-240.

The flow-based device abstraction model 400 can therefore define the capabilities, operational range and dimensions of a connected network device 170-240 in the time, frequency and space domains. As indicated above, the device abstraction model 400 is device specific, and thus need not include all of the fields 410-500 described above, but instead need only include those fields that are relevant to the particular connected network device 170-240. Moreover, the fields 410-500 themselves do not have a predetermined size (in terms of bits per field). Instead, the number of bits per field can be dynamically selected and programmed on a per-device basis.

The relevant fields of the flow-based device abstraction model 400 can each be populated with a specific value in order to define a single optical, wireless or IoT data flow (depending upon whether the connected network device is an optical, wireless or IoT device). Alternatively, the relevant fields of the flow-based device abstraction model 400 can each be populated with a range of values, in order to define a range or flows or a flow space or a set of connectivities. Further, a connected network device 140-170 (i.e. an optical, wireless or IoT gateway device) can be modelled as an entity such that its inputs and output operational range and characteristics are defined by the flow-based device abstraction model, whilst its switching function is modelled as the mapping between the input flow spaces and the output flow spaces.

The protocol mapping layer module 130 is operative to "translate" commands and messages from the SDN controller 150 into commands and messages in the native format of the connected device 170-240 (i.e. command and messages that comply with the requirements of the control and message data protocol under which the connected device 170-240 operates). Similarly, in the opposite direction the protocol mapping layer module 130 translates commands and data received from the connected device 170-240 into commands and messages in the native format of the SDN controller 150 (i.e. OpenFlow® protocol compliant commands and message data) that can be understood by the SDN controller 150.

This mapping is achieved using the device abstraction model 400 created by the device abstraction layer module 120. The protocol mapping layer module 130 maps the device abstraction module 400 for control, configuration, monitoring and operation of the connected network device 170-240 into standard and vendor specific messages that are compliant with the OpenFlow® protocol (version 1.0, addendum 0.3, v1.4 or higher as specified in the OpenFlow® standard). In this way, when the SDN controller 150 issues an OpenFlow® compliant message in order to control, configure or monitor a connected network device 170-240, the command or data message is "translated" into a command or data message that is compliant with the protocol under which the connected network device 170-240 operates. This "translated" message is transmitted to the connected network device by the vendor and technology specific layer module 110, and the connected network device 170-240 can take appropriate action in response. Similarly, when a connected network device 170-240 issues a message, e.g. to report its status or configuration, it does so in a format that is compliant with the protocol under which the connected network device 170-240 operates. The message is transmitted to the vendor and technology specific layer module 110, which passes it on to the protocol mapping layer module 130, where it is translated, using the device abstraction model 400, into an OpenFlow® compliant message that can be understood and acted on by the SDN controller 150.

Although the interface device 100 has been described above as a hardware device which sits between the SDN controller 150 and the connected network device 170-240, the functionality of the interface device 100 could equally be realised by software or firmware modules distributed between the SDN controller 150 and the connected network device. Thus, the SDN specific parts of the interface device 100, namely the protocol mapping layer module 130, could be implemented as a software module forming part of a network operating system of an SDN controller, whilst the device-specific parts of the interface device 100, could be implemented as a software module for integration in the device firmware of a network device 170-240.

The interface device 100 is plug and play compatible, meaning that it can simply be connected to a network device 170-240 and to an SDN controller 150 to enable control and monitoring of the configuration and operation of network device 170-240 by the SDN controller, using standard OpenFlow® messages or vendor-specific message without any additional set-up or configuration. The interface device 100 is able to support a wide variety of network devices including (but not limited to), for example, optical fibre switches, optical WDM switches, optical flexi WDM switches, optical fixed grid WDM switches, optical fixed grid WSS switches, optical flexi grid WSS switches, wireless access point controllers (including WiFi controllers and eNodeBs of LTE or LTE-A networks), wireless access points and IoT gateways. In fact, the interface device 100 can be connected to any network device that controls connectivity, bandwidth or flow of data in any combination of the time, frequency and space dimensions, to enable control and monitoring of the connected network device by an SDN controller 150. Thus the interface device 100 permits the use of SDN and OpenFlow® principles with modern and legacy network devices that do not natively support OpenFlow®, and supports vendor specific features of such devices.

Although the interface device 100 has been described as permitting interoperability between an OpenFlow® compliant SDN controller 150 and a connected network device 170-240, it will be appreciated that the principles of the invention are equally applicable to other software defined networking protocols and methodologies.

The invention claimed is:

1. An interface device for interfacing between a network device and a software-defined networking (SDN) controller, the interface device comprising:
   a first interface for connecting the interface device to the SDN controller;
   a second interface for connecting the interface device to the network device;

a vendor and technology specific layer module, which is operative to transmit control and message data to, and to receive control and message data from, the network device in a native control and message data protocol of the network device;

a device abstraction layer module, which is operative to generate a device abstraction model representing capabilities of the network device; and a protocol mapping layer module, which is operative to map control and message data used by the network device onto the device abstraction model, such that messages issued by the SDN controller in its native message format can be transmitted to the network device in the native message format of the network device, and messages issued by the network device in its native message format can be transmitted to the SDN controller in the native message format of the SDN controller.

2. The interface device according to claim 1 wherein the SDN controller is compliant with the OpenFlow protocol.

3. The interface device according to claim 1 wherein the device abstraction layer module is operative to generate a device abstraction model representing switching capabilities of the network device in one or more of: time, space and frequency domains.

4. The interface device according to claim 1 wherein the device abstraction layer module is operative to generate a device abstraction model representing switching, transmission and data collection capabilities of the network device in one or more of time, space and frequency domains.

5. The interface device according to claim 4 wherein the vendor and technology specific layer module is operative to capture capabilities of the network device, and wherein the device abstraction layer module is operative to generate the device abstraction model based on the captured capabilities.

6. The interface device according to claim 1, wherein the first interface comprises an Ethernet socket layer.

7. The interface device according to claim 1, wherein the network device comprises one or more of:
an optical fibre switch;
an optical wavelength division multiplexing switch;
an optical flexi wavelength division multiplexing switch;
an optical fixed grid wavelength selective switching switch;
an optical flexi grid wavelength selective switching switch;
a wireless access point controller;
a WM controller;
an eNodeB of an LTE or LTE-A network;
a wireless access point; and
an Internet of Things gateway.

8. The interface device according to claim 1, wherein the second interface supports one or more of the following interfaces and protocols:
Ethernet;
Secure Shell;
Telnet;
Transaction Language 1;
Simple Network Management Protocol;
Control And Provisioning of Wireless Access Points; and
Internet Control Message Protocol.

9. The interface device according claim 1, wherein the device abstraction model includes one or more of the following fields:
a port or space field relating to space switching capabilities supported by the network device;
a wavelength (lambda) or centre frequency field relating to a number of frequency channels or wavelength channels supported by the network device 170-240;
a bandwidth field relating to maximum and minimum bandwidths supported per frequency or wavelength by the network device 170-240;
a timeslot field relating to the number of time slots and their duration supported by the network device, if the network device supports timeslot switching;
a bitrate field relating to the data bitrate ranges supported by the network device;
a power field relating to the signal power range supported by the network device;
a signal type field relating to signal formats and modulation types supported by the network device;
a features field is used to accommodate device-specific features of the network device;
a network name field relating to network names used by the network device;
an IP Ethernet header field used to capture IP or Ethernet headers used by the network device.

10. The interface device according to claim 1, wherein the interface device is plug and play compatible.

11. The interface device according to claim 1, Wherein the vendor and technology specific layer module, the device abstraction layer module and the protocol mapping layer module are implemented as software modules configured to execute on processing hardware of the interface device.

* * * * *